May 8, 1962 T. B. KEESLING 3,033,483

REEL STRUCTURE FOR WINDING OF TAPE

Filed Aug. 28, 1959 2 Sheets-Sheet 1

INVENTOR.
THOMAS B. KEESLING

BY

Allen and Chromy

ATTORNEYS

REEL STRUCTURE FOR WINDING OF TAPE

Filed Aug. 28, 1959 2 Sheets-Sheet 2

INVENTOR.
THOMAS B. KEESLING
BY
Allen and Chromy
ATTORNEYS

United States Patent Office 3,033,483

Patented May 8, 1962

3,033,483

REEL STRUCTURE FOR WINDING OF TAPE

Thomas B. Keesling, Los Gatos, Calif., assignor to Cycle Equipment Company

Filed Aug. 28, 1959, Ser. No. 836,631
2 Claims. (Cl. 242—74)

The present invention relates to tape winding equipment and more particularly to tape winding reels having means for enabling easy control of the tape both in being engaged with the reel for winding thereabout and in being disengaged from the reel to be removed therefrom.

It is the general object of the invention to provide an improved reel structure for tape winding equipment.

Another object of the invention is to provide a detachable tape control element which when attached to the reel structure is adapted to be moved between different positions into engagement and disengagement with both the tape and the reel structure.

Other objects and advantages of the invention will be apparent from the following description of a preferred embodiment thereof as illustrated in accompanying drawings in which.

The reel structure shown herein is of the general type disclosed in the co-pending application of Thomas B. Keesling, Serial No. 665,197, filed June 12, 1957 for Tape Winder, and this application referred to for details of structure not shown herein.

Figure 1:
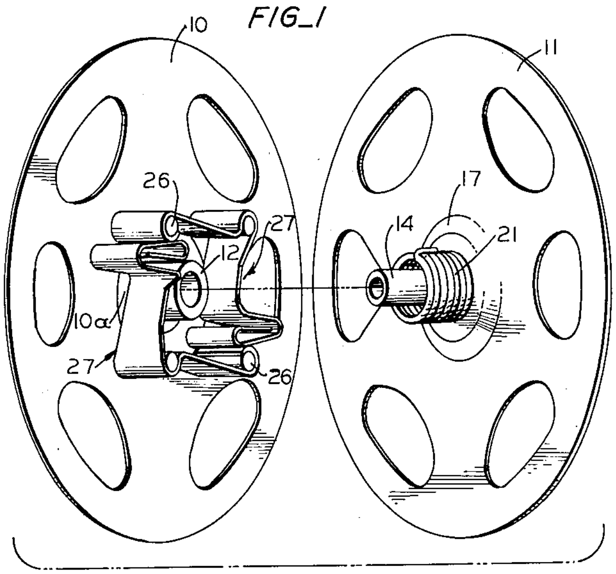
FIGURE 1 is a perspective view of the two flanges of the reel structure disposed in opposite angled relation to the plane of the drawing so as to expose the inner surfaces thereof.
Figure 2:
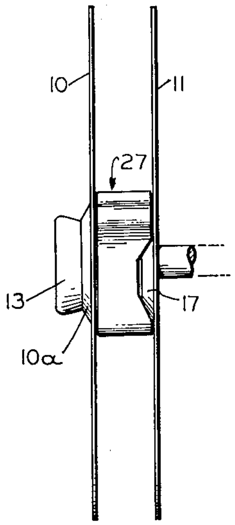
FIGURE 2 is an elevational view of the assembled reel structure.
Figures 5, 6, 7, 8:
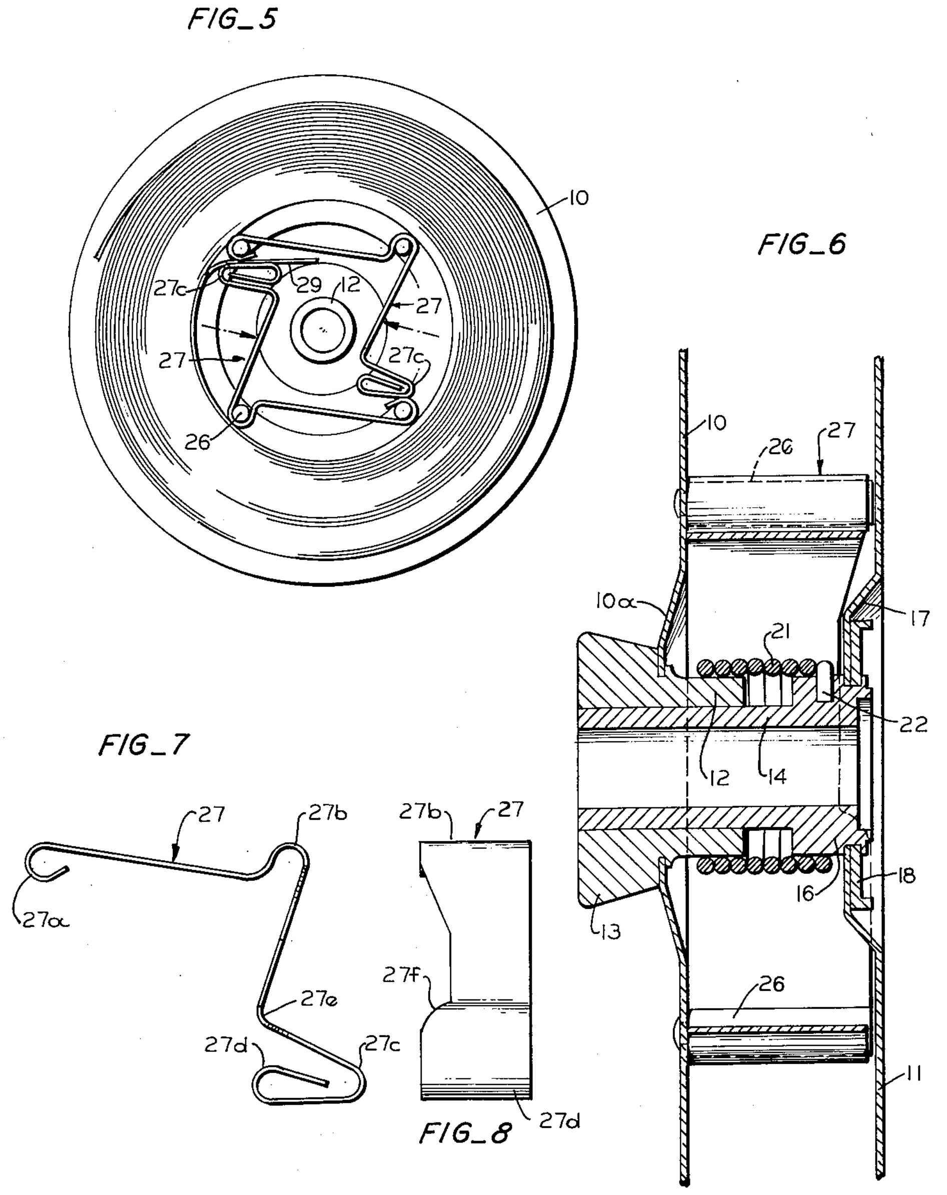
FIGURE 5 is a view similar to FIGURE 4 but shows a tape retaining element moved to release the tension on the roll of tape which was placed thereon during winding.
FIGURE 6 is an enlarged sectional view through the center portion of the reel structure.
FIGURE 7 is an elevational view of a tape retaining element as seen from its edge.
FIGURE 8 is a side elevational view of a tape retaining element.

The reel structure of the present invention comprises a pair of inner and outer flanges 10 and 11 (FIGS. 1, 2 and 6) which are separable to allow access to the wound tape and to the tape retaining means as described hereinafter. The inner flange 10 has a central hub 12 to which the central dished portion 10*a* is staked or riveted, the hub having an outer handle portion 13. The aperture in the hub 12 is engaged by a sleeve 14 forming a part of the outer flange and having an enlarged portion 16 of the same outer diameter as the hub 12, for a purpose later discussed. The sleeve 14 is stake riveted to the disked central portion 17 of the flange 11, together with a clutch plate 18. A spring drive and clutch member 21 has one end 22 seated in a suitable aperture of portion 16 of the sleeve 14 and has its other end frictionally engaged with the hub 12 when the parts are assembled as shown in FIGS. 2 and 6. This assembly is accomplished by a pushing and rotative action so that the spring 21 provides a one-way detachable clutch connection between the two flanges of the reel structure.

Figures 3, 4:
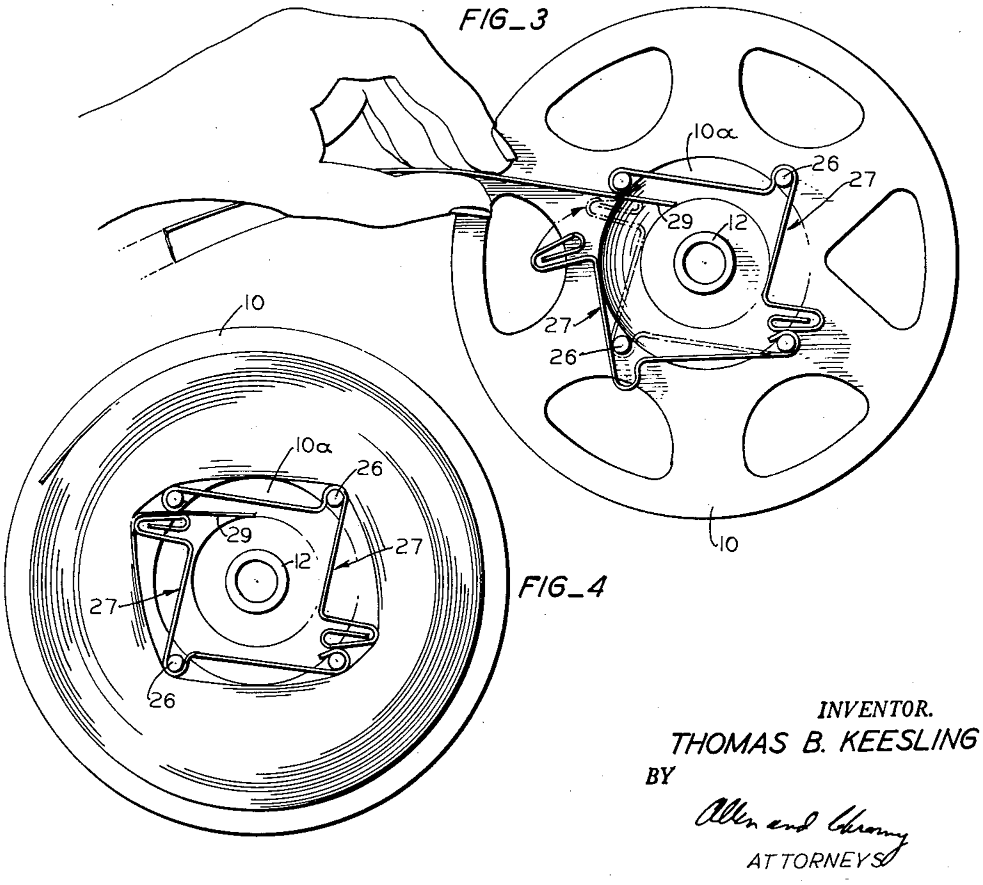
FIGURE 3 is a view of the outer part or flange of reel structure illustrating the method of engaging the tape with the tape retaining element thereof.
FIGURE 4 is an elevational view of the outer flange of the reel structure showing the tape retaining elements and the flange with a roll of tape wound thereon as it appears after winding and before removal from the machine.

The reel flange 10 (FIGS. 1, 3 and 6) has four pins or tape retaining elements 26 riveted therein at equally spaced intervals and at equal radial distances from the axis of the reel to define a tape receiving portion of the reel structure. These pins 26 provide mounting means for a pair of tape retaining elements which are similar in construction. Each of these elements 27 has a tubular end portion 27*a* which is formed in circular fashion to fit snugly about one of the pins 26, an intermediate semicircular formed portion 27*b* which is spaced to frictionally engage about another one of the pins 26, and a releasable end portion which is formed of a pair of U-shaped overlapped bends 27*c* and 27*d*, providing for spring-urged frictional engagement with a third one of the pins 26 or the cooperating tubular portion 27*a* of a second retaining element. Intermediate portions 27*c* and 27*b* the tape retainer has a recessed construction at 27*e* which provides, as illustrated in FIGURE 5, a finger space for engagement of the two tape retainers 27, so as to move the portions 27*c* which are normally exposed to engage the tape as shown in FIG. 4 to a retracted position where the tension on the tape is released, and it can be easily removed from the reels. Also the end portion 27*c* in frictional engagement with the pin 26 or the end 27*a* of the other tape retainer provides for frictional retaining of the end of the tape as shown at 29 in FIGS. 3, 4 and 5.

Figure 9:
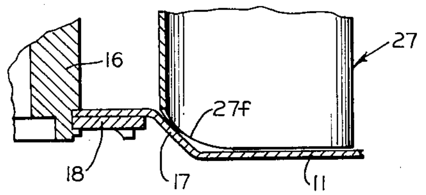
FIGURE 9 is a sectional view enlarged to illustrate one relation of the cam surface of a tape retaining element and the cooperating flange of the reel structure.

The recessed portion 27*e* (FIGS. 8 and 9) is cut away on its edge at 27*f* to provide a cam surface to cooperate with the cam surface formed by the dished portion 17 of the inner flange 11. If a tape retainer tends to remain in retracted position, i.e. in the position shown in FIG. 5 when the reel is reassembled for the reception of tape, it will be forced outwardly to the normal tape position as shown in FIG. 4.

It will be noted that inserting the tape, one of the tape retainers 27 can be hinged outwardly about a pin 26, i.e. be placed in a full line position in FIG. 3 so that the end of the tape 29 can be easily inserted and then the tape retainer can be moved to its phantom line position to engage and hold the tape.

While I have shown and described a preferred embodiment of the invention, it will be apparent that the invention is capable of variation and modification from the form shown, so that the scope thereof should be limited only by the proper scope and interpretation of the claims appended hereto.

I claim:

1. A tape winding reel structure having a pair of opposed flanges including a circular flange having adjacent its center at least three elements projecting substantially at right angles to said circular flange, and a tape retaining spring pivoted at one end on one of said elements, said spring having another end and a seat intermediate said ends for engaging the outside of another of said elements and having said another end free and bent to form a tape retaining means which frictionally engages the third of said elements, said tape retaining spring being recessed intermediate its ends to provide a space between it and a coil of tape wound thereabout as a finger receiving recess whereby the bent end of said spring can be moved inwardly to release the coil of tape.

2. A tape winding reel structure as recited in claim 1 in which said spring has a cam surface, and one of said flanges has a cooperating cam surface formed thereon, said cam surfaces being disposed to move said tape retaining spring to its normal tape receiving position upon placing said flanges in cooperative parallel relation.

References Cited in the file of this patent

UNITED STATES PATENTS

| | | |
|---|---|---|
| 927,604 | Seib | July 13, 1909 |
| 1,631,432 | Schuetz | June 7, 1927 |
| 2,341,957 | Storey | Feb. 15, 1944 |
| 2,476,636 | Spisak | July 19, 1949 |
| 2,662,701 | Weber | Dec. 15, 1953 |
| 2,762,576 | Herr | Sept. 11, 1956 |
| 2,868,473 | Hoisington | Jan. 13, 1959 |

FOREIGN PATENTS

| | | |
|---|---|---|
| 270,188 | Germany | Feb. 11, 1914 |
| 152,181 | Great Britain | Oct. 14, 1920 |